W. F. HUSCHLE, Jr.
RUNNING BOARD SEAT FOR AUTOMOBILES.
APPLICATION FILED JULY 3, 1915.
1,158,223.
Patented Oct. 26, 1915.
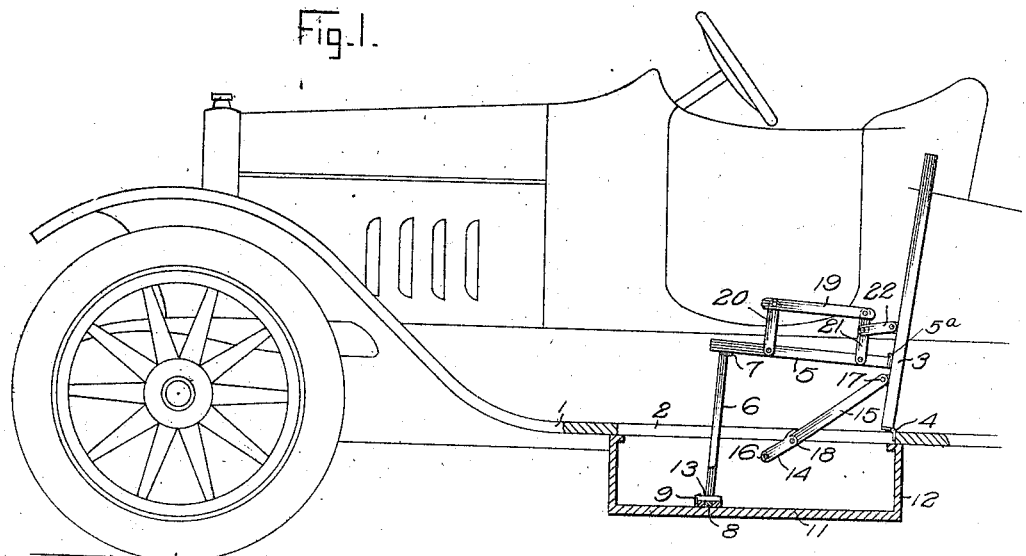
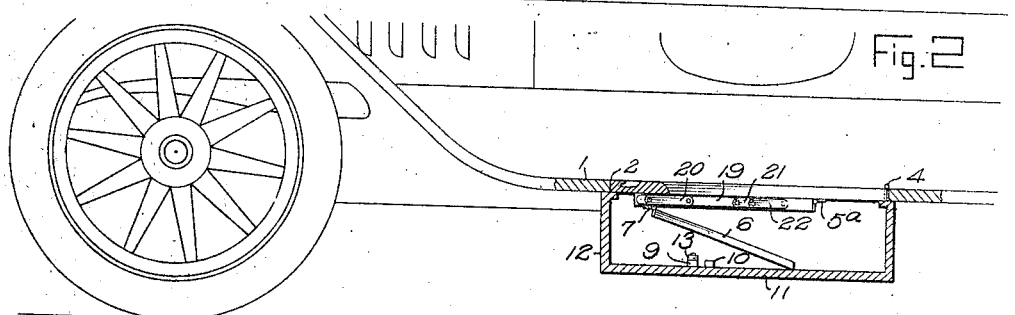
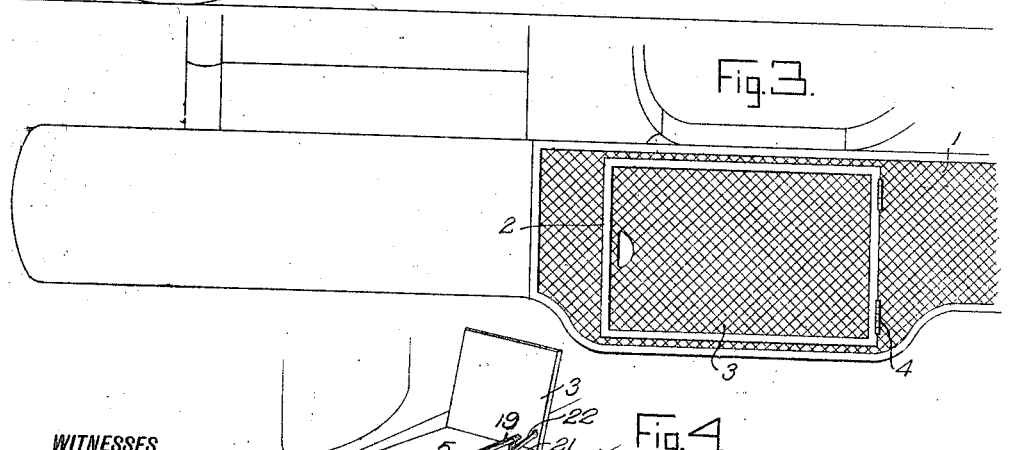
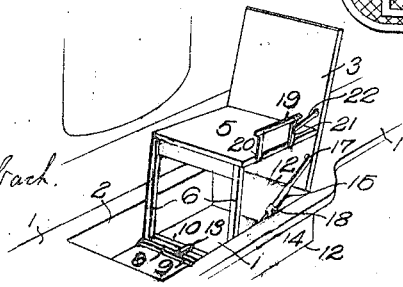
WITNESSES
INVENTOR
William F. Huschle Jr.
BY
ATTORNEYS

UNITED STATES PATENT OFFICE.

WILLIAM F. HUSCHLE, JR., OF NEW YORK, N. Y.

RUNNING-BOARD SEAT FOR AUTOMOBILES.

1,158,223.   Specification of Letters Patent.   Patented Oct. 26, 1915.

Application filed July 3, 1915. Serial No. 37,923.

*To all whom it may concern:*

Be it known that I, WILLIAM F. HUSCHLE, Jr., a citizen of the United States, and a resident of the city of New York, Jamaica, borough of Queens, in the county of Queens and State of New York, have invented a new and Improved Running-Board Seat for Automobiles, of which the following is a full, clear, and exact description.

This invention relates to an auxiliary seat for automobiles, and it has for its general objects to provide a novel and practical seat which is incorporated with a running board of an automobile so that the seat will be located outside the body of the car and not interfere with the comfort of those occupying the regular seats, the auxiliary seat being of such a nature that when it is not in use it is folded down and forms a part of the running board.

A further object of the invention is the provision of an extra seat for an automobile, which seat comprises a back that forms a part of the running board, and on the normal under side of this part is the seat proper, which is hingedly connected with the back and has a leg support which coöperates with suitable bracing means for holding the auxiliary seat in set-up or unfolded condition, and to protect the auxiliary seat when folded or collapsed, a box is fastened to the under side of the running board so as to receive the seat.

With such objects in view, and others which will appear as the description proceeds, the invention comprises various novel features of construction and arrangement of parts which will be set forth with particularity in the following description and claims appended hereto.

In the accompanying drawing, which illustrates one embodiment of the invention and wherein similar characters of reference indicate corresponding parts in all the views, Figure 1 is a side view of the front portion of an automobile with the auxiliary seat in raised position; Fig. 2 is a similar view showing the seat collapsed; Fig. 3 is a plan view of the running board that contains the auxiliary seat; and Fig. 4 is a perspective view of the auxiliary seat.

Referring to the drawing, 1 designates a running board of an automobile which has a tread portion provided with an opening 2 in which is normally disposed a rectangular or other section 3 in the form of a plate, such plate being connected at its rear end by hinges 4 to the running board proper. This section 3 swings upwardly and rearwardly so as to form the back of the auxiliary seat, as shown in Figs. 1 and 4. The seat bottom 5 has its rear edge connected by a hinge 5ª with the back 3, and this seat bottom is adapted to be propped up by front legs 6 which are connected by a hinge 7 to the under side of the seat bottom near the front of the same. The front legs are connected together at their bottom by a cross-piece 8 which is adapted to seat in a recess formed by two strips 9 and 10 fastened to the bottom 11 of the box 12 that is fastened to the under side of the running board so as to form an inclosure for the parts of the auxiliary seat when the same is closed. A turn button 13 is adapted to engage over the cross-piece 8 so as to lock the supporting legs 6 in proper position. To prevent collapsing of the auxiliary seat backwardly, a bracing element for the back 3 is employed, such element in the present instance consisting of a pair of links 14 and 15 which are respectively hingedly connected at 16 and 17 to the box 12 and back 3. A knuckle joint 18 connects the links together so that the links can collapse only upwardly or forwardly. By disengaging the legs from the recess or stop formed by the strips 9 and 10 and collapsing the bracing element, the seat can fold from the position shown in Fig. 1 to that shown in Fig. 2. If desired, an arm 19 can be arranged at the outer edge of the seat bottom 5 so as to enable the occupant to more safely remain seated. This arm 19 may be connected by parallel links 20 and 21 to the seat bottom 5, and the rear link 21 is connected by a link 22 with the back 3, so that, as the auxiliary seat is folded, the arm 19 will fold downwardly along the side of the seat bottom, as clearly shown in Fig. 2.

An auxiliary seat of the character herein explained is of light, durable and compact design; is easily set up or knocked down, and does not in any way detract from the appearance of the car, as the auxiliary seat attachment has the appearance of a tool box hung on the under side of the running board.

From the foregoing description taken in connection with the accompanying drawing, the advantages of the construction and method of operation will be readily understood by those skilled in the art to which the invention appertains, and while I have described the principle of operation, together with the device which I now consider to be the best embodiment thereof, I desire to have it understood that the device shown is merely illustrative and that such changes may be made when desired as fall within the scope of the appended claims.

Having thus described my invention, I claim as new and desire to secure by Letters Patent:

1. The combination of an automobile running board, with a collapsible auxiliary seat, the back of which forms a part of the running board.

2. The combination with an automobile running board provided with an opening, with an auxiliary seat foldable into and out of the opening and including a back normally closing the opening.

3. The combination with an automobile running board provided with an opening, with an auxiliary seat foldable into and out of the opening and including a back normally closing the opening, and a box carried by the under side of the running board and forming a housing for the auxiliary seat.

4. The combination of an automobile running board, with an auxiliary seat having a back normally forming part of the tread of the running board, and a seat bottom attached to the normal under side of the back.

5. The combination of an automobile running board, with an auxiliary seat having a back normally forming part of the tread of the running board, a seat bottom attached to the normal under side of the back, and a prop for the seat bottom.

6. The combination of an automobile running board, with a box carried thereby, the top of the box being a hinged section normally forming the tread portion of the running board and adapted when raised to form the back of a seat, and a seat bottom connected with the said back.

7. The combination of an automobile running board, with a box carried thereby, the top of the box being a hinged section normally forming the tread portion of the running board and adapted when raised to form the back of a seat, a seat bottom connected with the said back, and a prop between the bottom of the box and the front of the seat bottom.

8. The combination of an automobile running board, with a box carried thereby, the top of the box being a hinged section normally forming the tread portion of the running board and adapted when raised to form the back of a seat, a seat bottom connected with the said back, a prop between the bottom of the box and the front of the seat bottom, and a bracing element between the box and the seat back and including a knuckle joint to permit the bracing element to collapse when the prop is removed.

9. The combination with an automobile running board having an opening and a tread section normally fitting the opening, a hinge means connecting the rear end of the section to the running board to swing upwardly and rearwardly, a box disposed under and carried by the running board at the said opening, a seat bottom hingedly connected with the said section, a leg prop connected with the seat bottom, catch means for fastening the prop to the bottom of the box, and bracing means for the said section when the latter is in raised position.

10. The combination of an automobile running board having a movable section adapted to normally form part of the tread of the running board and movable substantially to upright position to form an auxiliary seat back, and a seat bottom connected with the back and adapted when the back is in raised position to lie above the level of the running board.

11. The combination of an automobile running board having a movable section adapted to normally form part of the tread of the running board and movable substantially to upright position to form an auxiliary seat back, a seat bottom connected with the back and adapted when the back is in raised position to lie above the level of the running board, and a side arm disposed at the outer edge of and connected with the seat bottom.

In testimony whereof I have signed my name to this specification in the presence of two subscribing witnesses.

WILLIAM F. HUSCHLE, Jr.

Witnesses:
ANDREW C. ROESCH,
CHARLES A. ROESCH.